June 12, 1945. M. LOCKWOOD 2,377,948
ROASTING RACK
Filed July 11, 1944

Maysie Lockwood
INVENTOR.

BY CA Snow Co.
ATTORNEYS.

Patented June 12, 1945

2,377,948

UNITED STATES PATENT OFFICE 2,377,948

ROASTING RACK

Maysie Lockwood, Dansville, N. Y.

Application July 11, 1944, Serial No. 544,433

1 Claim. (Cl. 99—426)

This invention relates to a rack designed primarily for holding meat roasts while being cooked.

Heretofore it has been necessary before cooking a meat roast, to use cords or skewers for the purpose of holding the meat together. These have been objectionable not only because of their presence in the cooked meat but also because they interfere with the carving of the meat.

An object of the present invention is to provide a rack on which the meat can be placed after being formed into a roast and which serves the purpose of holding the meat together without the necessity of utilizing cords, etc., as heretofore.

Another object is to provide a rack which is simple and compact in construction and can be manipulated readily.

A further object is to provide a rack from which the cooked meat can be removed readily, this rack serving the purpose of holding the meat together during the roasting operation.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawing the preferred form of the invention has been shown.

In said drawing

Figure 1:
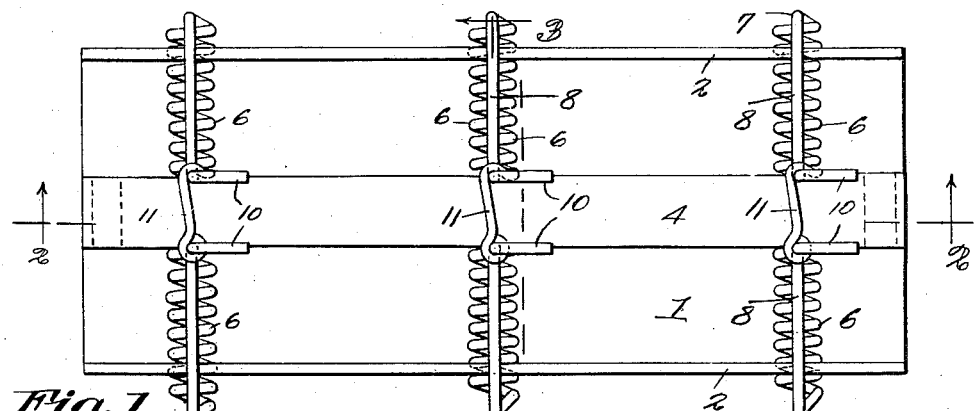
Figure 1 is a top plan view of the rack.
Figure 2:
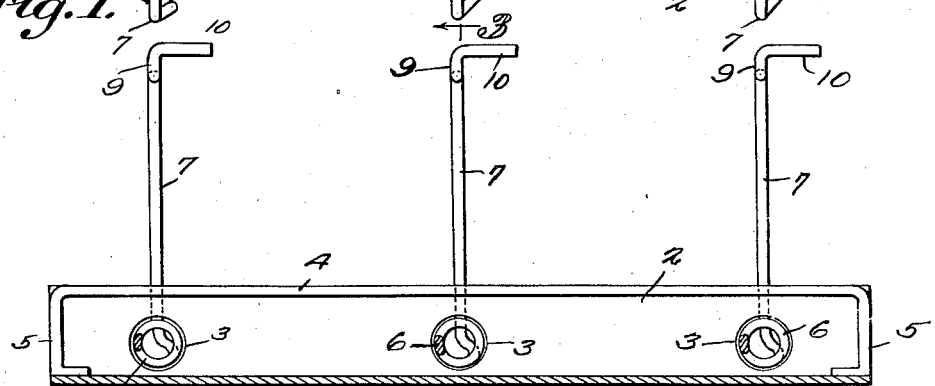
Figure 2 is a section on line 2—2, Figure 1.

Referring to the figures by characters of reference, 1 designates a plate which can be of aluminum or any other suitable material and of any desired size. The side portions of this plate are extended upwardly to form flanges 2 which are parallel. Each flange has spaced openings 3 therein, the openings in each flange being directly opposite to the corresponding openings in the other flange.

Extended above and parallel with the plate 1 is a supporting strip 4 which likewise can be made of aluminum or other suitable metal, the ends of this strip being downturned as at 5 and secured to the ends of the plate 1. The top surface of the strip 4 is preferably substantially flush with the top edges of the flanges 2.

Extended under the supporting strip 4 and through the openings 3 are coiled springs 6 and both ends of each spring merge into upwardly extending spring arms 7 the upper portions of which are extended laterally toward each other, as at 8, so as to overhang portions of the springs. Each arm 8 has an upwardly extending finger 9 from which a handle portion 10 is extended laterally. On one of the fingers is mounted a hook 11 and the hook is adapted to move into engagement with the opposed finger 9 as shown particularly in Figs. 1 and 4 so as thereby to hold the arms 7 against moving away from each other.

Figure 3:
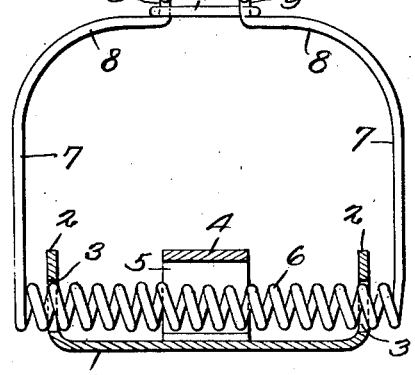
Figure 3 is a section on line 3—3, Figure 1.
Figure 4:
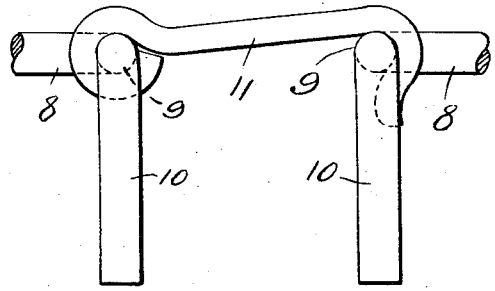
Figure 4 is an enlarged view of one of the fasteners and the parts cooperating therewith.

Normally the arms 7 are spread apart so that a roast to be cooked can easily be placed between the arms where it will rest on the supporting strip 4. The arms are then drawn toward each other until the hooks 11 can be moved into fastening positions as shown in Figs. 1, 3 and 4. Thus the roast will be gripped firmly and the rack with the meat gripped thereby, can be placed in a roaster so that the meat thus can be cooked in the usual way. After the cooking operation has been repeated, the rack with the meat therein is removed from the stove, the hooks 11 disengaged, and the arms 7 permitted to spring apart. Thus the meat will be released and can be lifted readily from the rack.

What is claimed is:

A device of the class described including a plate having side flanges provided with apertures, a roast-supporting member mounted on the plate between the flanges, coiled springs extending between the plate and strip and through the apertured flanges, upwardly extended meat-gripping arms integral with the ends of the respective springs, handles carried by the free end portions of the arms, and means on the arms for detachably joining them and holding them in meat-gripping positions.

MAYSIE LOCKWOOD.